(12) United States Patent
Maalderink

(10) Patent No.: US 8,454,880 B2
(45) Date of Patent: Jun. 4, 2013

(54) METHOD AND SYSTEM FOR LAYERWISE PRODUCTION OF A TANGIBLE OBJECT

(75) Inventor: Herman Hendrikus Maalderink, Nuenen (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 318 days.

(21) Appl. No.: 12/867,077

(22) PCT Filed: Feb. 13, 2009

(86) PCT No.: PCT/NL2009/050060
§ 371 (c)(1),
(2), (4) Date: Sep. 16, 2010

(87) PCT Pub. No.: WO2009/102200
PCT Pub. Date: Aug. 20, 2009

(65) Prior Publication Data
US 2011/0014355 A1    Jan. 20, 2011

(30) Foreign Application Priority Data
Feb. 14, 2008    (EP) ..................................... 08151446

(51) Int. Cl.
*B29C 35/08*        (2006.01)
(52) U.S. Cl.
USPC ......... 264/401; 264/308; 425/141; 425/174.4

(58) Field of Classification Search
USPC ........................ 264/401, 308; 425/141, 174.4
See application file for complete search history.

(56) References Cited

U.S. PATENT DOCUMENTS

| | | | |
|---|---|---|---|
| 5,358,673 A | 10/1994 | Heller et al. | |
| 5,984,444 A | 11/1999 | Hawley | |
| 6,048,487 A * | 4/2000 | Almquist et al. | ............. 264/401 |
| 2003/0205849 A1 | 11/2003 | Farnworth | |
| 2004/0228754 A1* | 11/2004 | Abe et al. | ......................... 419/6 |

FOREIGN PATENT DOCUMENTS

| | | |
|---|---|---|
| DE | 10344901 A1 | 5/2004 |
| EP | 0436352 A2 | 10/1991 |
| EP | 1525973 A1 | 4/2005 |
| WO | 9729901 | 8/1997 |

* cited by examiner

*Primary Examiner* — James Sanders
(74) *Attorney, Agent, or Firm* — Hoffmann & Baron, LLP

(57) ABSTRACT

A method for layerwise production of a tangible object comprises repeatedly performing method cycles. Each method cycle comprises the steps of solidifying a predetermined area of an uppermost liquid layer (10) of a liquid (3) in a reservoir (2), so as to obtain a solid layer of the tangible object, and creating, above, parallel and adjacent to the solid layer, a successive uppermost liquid layer of the liquid. Said creating of the successive liquid layer is carried out by spraying such liquid onto upper parts of the contents in the reservoir. A height distribution over at least part of the surface of the uppermost liquid layer is measured by means of a measuring device (6). Based on the measured height distribution, the solidifying is carried out to compensate for unflatness of the measured height distribution.

4 Claims, 5 Drawing Sheets

METHOD AND SYSTEM FOR LAYERWISE PRODUCTION OF A TANGIBLE OBJECT

This application is the U.S. National Phase of, and Applicant claims priority from, International Patent Application Number PCT/NL2009/050060 filed 13 Feb. 2009 and European Patent Application Number 08151446.5 filed 14 Feb. 2008, each of which are incorporated herein by reference.

FIELD AND BACKGROUND OF THE INVENTION

The invention relates to a method for layerwise production of a tangible object. The invention also relates to a system for layerwise production of a tangible object.

Such techniques are used in the field of Layered Manufacturing Technology (LMT), often referred to as Rapid Prototyping (RP) or Rapid Manufacturing (RM), to produce a tangible object. Rapid Prototyping (RP) and Rapid Manufacturing (RM), are called "rapid" since they do not require a mould to be designed and manufactured.

The solidifying can use any suitable chemical or physical process to solidify the predetermined area of the liquid layer. The solidifying means may for example initiate a chemical reaction of a component in the liquid which results in a solid reaction product. For example, the liquid may be a liquid resin which can be cured by electro-magnetic radiation, for example a photo-polymer of which polymerisation can be activated by projecting light of a suitable wavelength. The liquid can be transformed into a solid by a suitable type of energy and the solidifying means may include a source of energy which can selectively provide the energy to the predetermined area. The source of energy may for example include a source of electro-magnetic radiation. The solidifying means may include a light source which can emit light which is projected onto the predetermined area of the liquid layer via a projection unit of the solidifying means in a pattern corresponding to the desired shape and size of the solid layer.

Several techniques are known for creating a successive uppermost liquid layer of the liquid.

For example, it is known to apply a thicker than required layer of liquid by flooding the already built part of the object under construction. Then, the excess material is removed by means of a wiper blade. The wiping results in forces being transmitted to the object under construction. In order to avoid that these forces are becoming too high, the wiping has to be performed with restricted speed. In addition, such speed restriction is necessary in order to avoid that hollow spaces of the object under construction are being emptied by the action of the wiper blade.

In another known technique, a construction shape is applied, which construction shape is transparent for radiation incident from above. In each method cycle, the solidifying of the predetermined area of the liquid layer is carried out when said liquid layer is adjoining the construction shape. After solidifying, the obtained solid layer is separated from the construction shape. The separating results in forces being transmitted to the object under construction. In order to avoid that these forces are becoming too high, the separating has to be performed with restricted speed. Another factor that results in restricted speed of this known technique, is that it takes relatively long time for the liquid to flow in between the construction shape and the object under construction.

A further known technique is disclosed in WO97/29901. In this known technique a controllable means is provided above a vessel filled with a hardenable liquid medium. The controllable means contains a casting bob which is erected on top of the vessel and is provided with a slot at the bottom, and means to move said casting bob in a relative manner over the surface of the medium contained in the vessel. The liquid medium is cast, in the form of a stable curtain, on a previously formed layer. A drawback of this known technique is that, the thinner the new liquid layers are required to be, the more difficult (or even impossible) it is to produce these by means of such stable curtain. Hence, there is a limitation on the shallowness of the new layers to be created, which results in a limitation on the accuracy of the object to be produced.

It is furthermore remarked that U.S. Pat. No. 5,358,673A discloses a method as well as a system for layerwise production of a tangible object. For instance, the spraying is disclosed in column 2, line 47 of U.S. Pat. No. 5,358,673A.

SUMMARY OF THE INVENTION

It is an object of the invention to enable a faster and more accurate layerwise production of a tangible object.

Therefore, according to a first aspect of the invention, a method is provided as claimed.

In this method according to the first aspect of the invention, for at least one of said method cycles, said creating of the successive liquid layer is carried out by spraying such liquid onto upper parts of the contents in the reservoir.

Spraying implies that the liquid is atomized, resulting in a spray of small liquid droplets. The falling down of these small droplets onto upper parts of the contents of the liquid reservoir results in only negligible forces being transmitted to the object under construction, even at high spraying speeds. In that sense the technique based on spraying is faster, since it does not require speed restricting measures such as needed for the techniques based on a wiper blade or based on a construction shape. Besides, a spray spreads quickly and in an evenly distributed manner, which also favourably influences the speed of the method. Furthermore, in comparison with the casted curtain technique disclosed in WO97/29901, the spraying enables thinner new liquid layers to be created, since the spray has a lower liquid density than pure liquid and since the liquid droplets spread out once they have fallen down onto upper parts of the contents of the reservoir.

Furthermore, in this method according to the first aspect of the invention, after at least part of such a successive uppermost liquid layer has been created in such a method cycle and before the solidifying is carried out in a consecutive such method cycle, a height distribution over at least part of the surface of the created uppermost liquid layer is measured by means of a measuring device; and, based on the measured height distribution, the solidifying is carried out to compensate for unflatness of the measured height distribution. This has the advantage that, by compensating for deficiencies in the measured height distribution, accuracy requirements for the object under construction can be met, even in cases when the uppermost liquid layer is relatively unflat, for example due to unwanted wave-like patterns in the deposited layer. Hence, the requirements for flatness of the deposited layer of liquid is lower, and consequently a simpler spraying system can be used. Another advantage is that, thanks to the said compensating, the solidifying can be carried out faster after creating at least part of the successive uppermost liquid layer, which results in faster layerwise production of tangible objects.

It is remarked that US2003205849A1 discloses in paragraph [0027] different "liquid displacement devices", all providing the ability to control precisely a surface level of curable liquid material. In paragraphs [0034] and [0035] of US2003205849A1 it is described that distance sensors are used to determine vertical distance D2 between the surface level 18 and a reference point. However, US2003205849A1 only discloses that a general height level is measured, not a height distribution over such surface, let alone measures to compensate for unflatness of the measured height distribution.

Furthermore, according to a second aspect of the invention, a system is provided as claimed.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION

Figure 1:
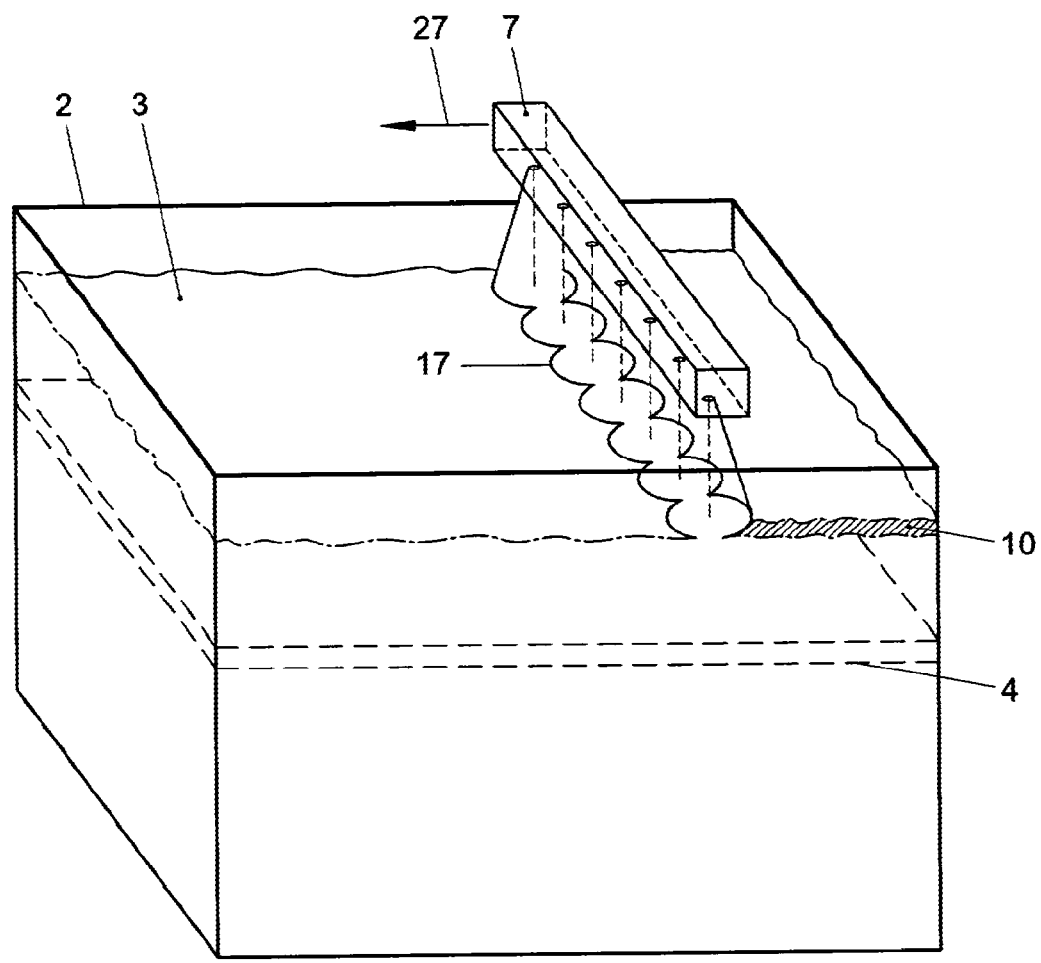
FIG. 1 schematically shows a perspective view of an example of an embodiment of a spraying means for use in a method and system according to the invention.
Figure 2:
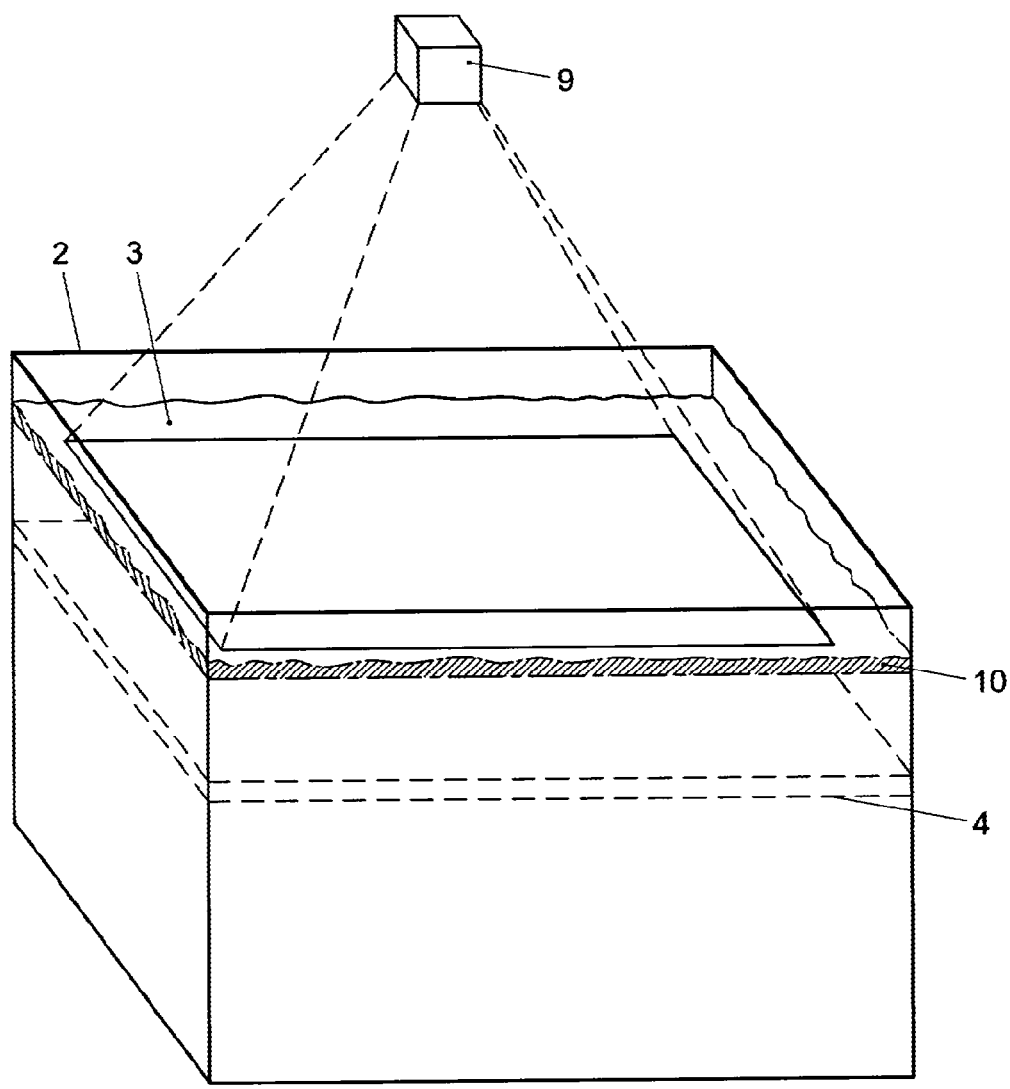
FIG. 2 schematically shows a perspective view of an example of an embodiment of a solidifying means for use, in co-operation with the spraying means of FIG. 1, in a method and system according to the invention.

FIGS. 1-4 show a liquid reservoir 2 containing a liquid 3 and a height-adjustable platform 4 therein. The liquid 3 is located above the platform 4. The reservoir with the liquid and the platform are for use in a method for layerwise production of a tangible object according to the invention.

The method according to the invention comprises repeatedly performing method cycles, wherein each method cycle comprises the steps of:
  solidifying a predetermined area of an uppermost liquid layer 10 of the liquid 3 in the reservoir 2, so as to obtain a solid layer of the tangible object, the solid layer thus having a predetermined shape; and
  creating, above, parallel and adjacent to the solid layer, a successive uppermost liquid layer 10 of the liquid 3 for carrying out a successive such method cycle for similar solidifying a predetermined area 20 of the successive liquid layer, so as to obtain a successive such solid layer adhered to the solid layer.

During the performing of the method, the platform 4 can serve to support the tangible object under construction. As the liquid level relative to the platform 4 will increase due to the cyclic creation of such successive uppermost liquid layers, the platform 4 may be lowered relative to the reservoir 2 during the performing of the method. The object under construction will then descend in the reservoir 2. For simplicity, corresponding height-adjusting means for the platform 4 are not shown in the figures.

As explained in the above introduction, the solidifying can use any suitable chemical or physical process to solidify the predetermined area of the liquid layer. In the shown examples, the solidifying is carried out by means of solidifying means 9, shown in a highly schematical form in FIGS. 2 and 4. In these figures, dashed lines extending from the solidifying means 9 mark a traveling space for radiation emitted by the solidifying means 9.

In the method according to the invention, for at least one of said method cycles, said creating of the successive liquid layer 10 is carried out by spraying such liquid onto upper parts of the contents in the reservoir 2. The spraying is carried out by means of spraying means. In the trade diverse spraying means suitable for this purpose can be obtained. The spraying means may for example comprise a single spray nozzle or other jet, or an array or matrix of such nozzles/jets. The spraying means may comprise diverse means for atomizing the liquid, for example hydraulically or by means of a gas.

Figure 4:
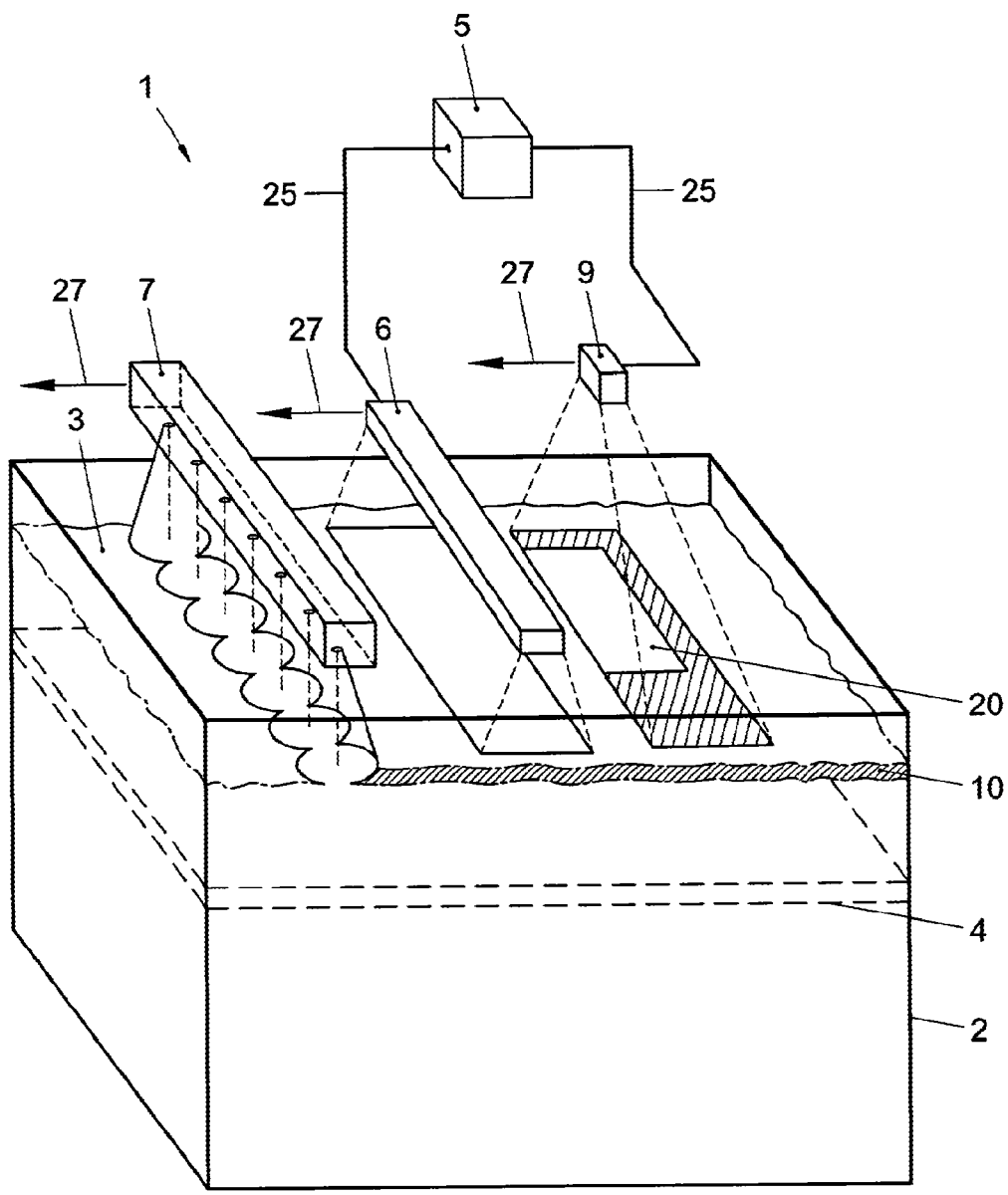
FIG. 4 schematically shows a perspective view of an example of an embodiment of a system according to the invention for use in a method according to the invention.

In the examples of FIGS. 1 and 4, the spraying means is indicated by reference numeral 7 and comprises an array of spray nozzles extending in line with each other. The produced spray 17 of atomized liquid is directed onto upper parts of the contents in the reservoir 2, while the spraying means 7 is moving in the direction 27 relative to the reservoir 2, thus forming the successive liquid layer 10.

Figure 3:
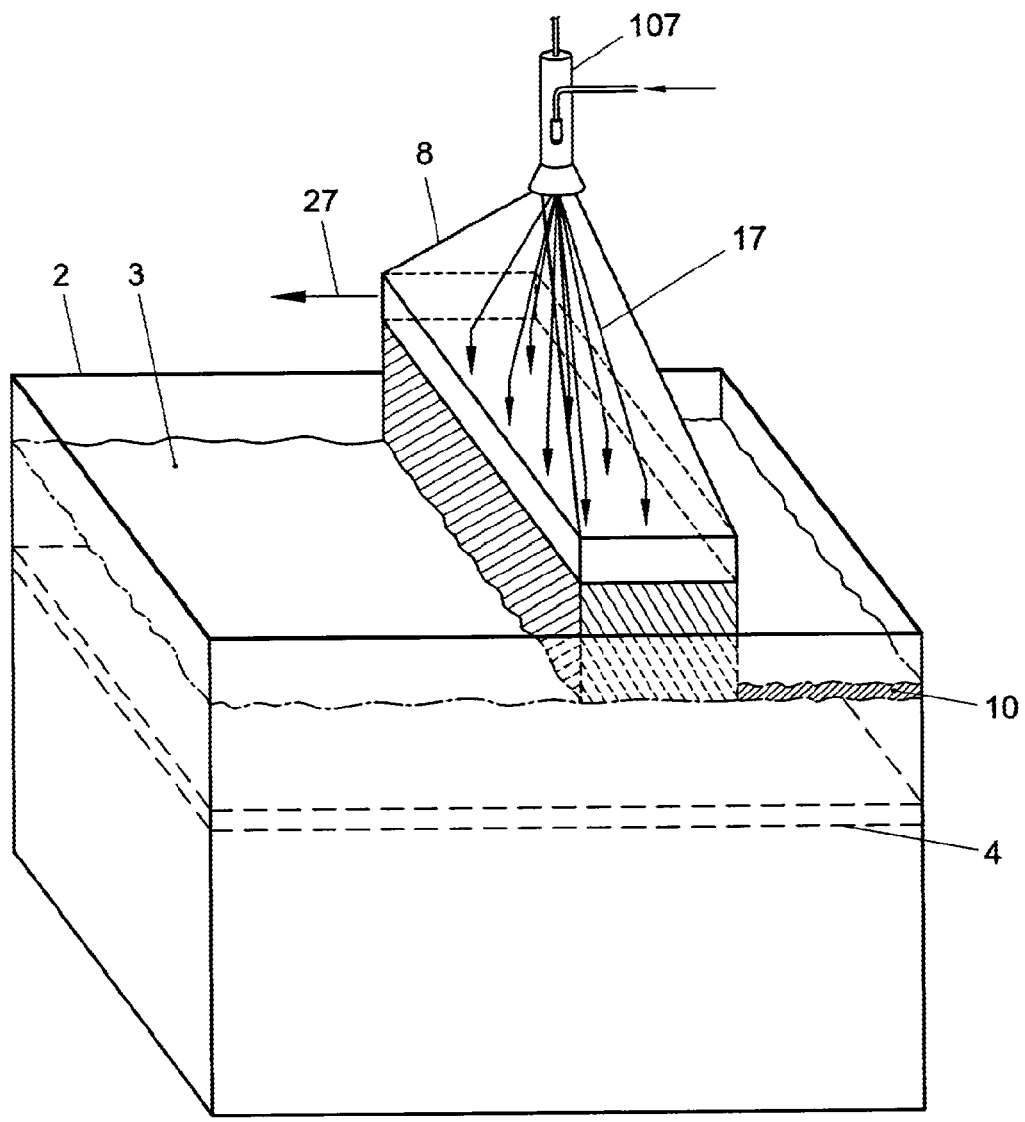
FIG. 3 schematically shows a perspective view of an example of another embodiment of a spraying means for use in a method and system according to the invention.

Reference is now made to FIG. 3, in which an example of another embodiment of a spraying means for use in a method and system according to the invention is shown. The spraying means shown in FIG. 3 comprises a single spray nozzle 107. The corresponding system according to the invention further comprises guiding means 8 for guiding the atomized liquid 17 produced by the spraying means 107. The shown guiding means 8 has the form of a kind of reversed funnel which shields the emitted spray 17. Other shapes and forms of such guiding means are possible, also in combination with an array or matrix of spray nozzles/jets. The produced spray 17 is directed onto upper parts of the contents in the reservoir 2, while the spraying means 107 as well as the guiding means 8 are moving in the direction 27 relative to the reservoir 2, thus forming the successive liquid layer 10.

Reference is now made to FIG. 4, in which a system 1 according to the invention is shown. The system 1 comprises the spraying means 7 of FIG. 1 and the solidifying means 9 of FIG. 2. In addition, the system 1 comprises a measuring device 6 for measuring a height distribution over at least part of the surface of the created uppermost liquid layer 10 and means 5 for controlling the solidifying means 9 to carry out the solidifying based on such measured height distribution in order to compensate for deficiencies in the measured height distribution, such as to compensate for unflatness of the measured height distribution. For that purpose, the controlling means 5 is communicatively connected with the measuring device 6 and with the solidifying means 9, which is schematically indicated in FIG. 4 by means of lines 25.

In operation, the spraying means 7, the measuring device 6, as well as the solidifying means 9 each move in the direction 27, in such way that during these movements 27 the measuring device 6 measures the height distribution of parts of the uppermost liquid layer 10 which were created shortly before by the spraying means 7, while the solidifying means 9 solidifies a predetermined area 20 of an uppermost liquid layer 10 of which the height distribution was measured shortly before by the measuring device 6.

The additional use of the measuring device 6 and the controlling means 5 in the system and method according to the invention has the advantage that, by compensating for deficiencies in the measured height distribution, accuracy requirements for the object under construction can be met, even in cases when the uppermost liquid layer 10 is relatively unflat, for example due to unwanted wave-like patterns in the deposited layer. Hence, the requirements for flatness of the deposited layer of liquid is lower, and consequently a simpler spraying system can be used. Carrying out the solidifying based on such measured height distribution in order to compensate for deficiencies in the measured height distribution can for example be done by calculating the amount of radiation that is locally needed to solidify no more or no less liquid than required by the target geometry.

Figure 5:
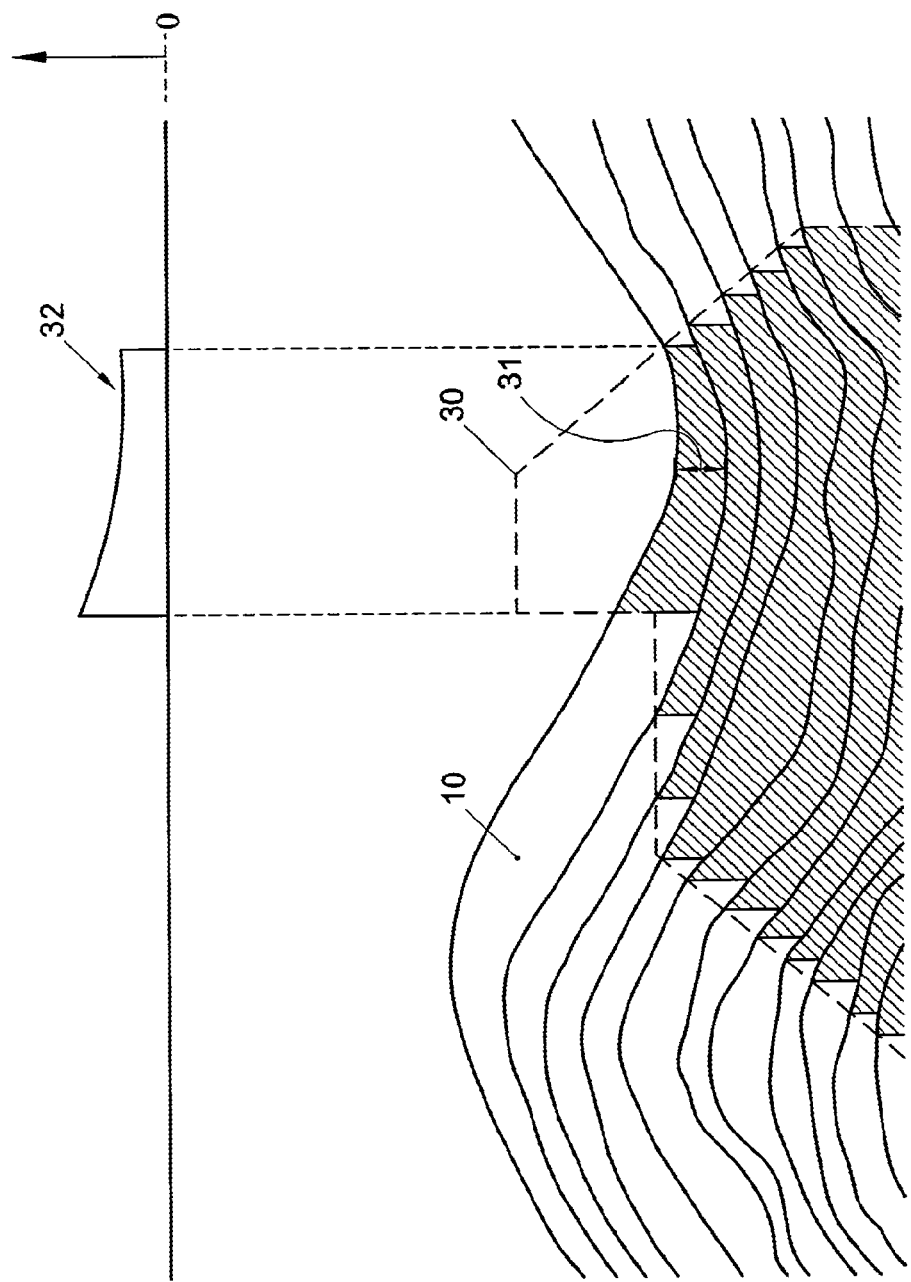
FIG. 5 schematically shows, in cross-sectional side view, a stage of an example of an embodiment of a method according to the invention.

Reference is now made to FIG. 5, in which an example of several consecutive liquid layers as they could be deposited by the spraying means are shown. The target geometry of the object under construction is represented by dashed lines 30. The individual layers in this example are neither flat nor homogenous in height. To determine for each portion of an uppermost liquid layer 10 whether it should be solidified or not, the coincidence of the target geometry with the measured height is analyzed. To determine the required amount of solidifying for each such portion of layer 10, the thickness of that layer portion is calculated based on the difference 31 between the current height measured and the height measured directly before solidifying the previous layer. The distribution of the amount of solidifying of layer 10 is represented by graph 32 (upper part of FIG. 5), which shows a higher amount of solidifying in portions where the difference 31 is larger. The hatched portion represents the realized geometry. The example of FIG. 5 may for example relate to a method according to the invention, wherein the solidifying is carried out by emitting radiation onto the predetermined area, and wherein said compensating is realized by calculating, based on the measured height distribution, a corresponding distribution of radiation intensity to be applied to the predetermined area. The graph 32 then relates to said distribution of radiation intensity.

The invention claimed is:

1. A method for layerwise production of a tangible object, the method comprising:
   providing a liquid reservoir containing a liquid; and
   repeatedly performing method cycles, each method cycle comprising the steps of:
      solidifying a predetermined area of an uppermost liquid layer of the liquid in the reservoir, so as to obtain a solid layer of the tangible object, the solid layer thus having a predetermined shape; and
      creating, above, parallel and adjacent to the solid layer, a successive uppermost liquid layer of the liquid for carrying out a successive such method cycle for similar solidifying a predetermined area of the successive liquid layer, so as to obtain a successive such solid layer adhered to the solid layer;
   wherein, for at least one of said method cycles, said creating of the successive liquid layer is carried out by spraying such liquid onto upper parts of the contents in the reservoir;
   characterized in that
      after at least part of such a successive uppermost liquid layer has been created in such a method cycle and before the solidifying is carried out in a consecutive such method cycle, a height distribution over at least part of the surface of the created uppermost liquid layer is measured by means of a measuring device; and
      based on the measured height distribution, the solidifying is carried out to compensate for unflatness of the measured height distribution.

2. A method according to claim 1, wherein the solidifying is carried out by emitting radiation onto the predetermined area, and wherein said compensating is realized by calculating, based on the measured height distribution, a corresponding distribution of radiation intensity to be applied to the predetermined area.

3. A system for layerwise production of a tangible object in a liquid reservoir containing a liquid therein, the system comprising:
   solidifying means for solidifying a predetermined area of an uppermost liquid layer of the liquid in the reservoir, so as to obtain a solid layer of the tangible object, the solid layer thus having a predetermined shape; and
   spraying means for spraying such liquid onto upper parts of the contents in the reservoir for creating, above, parallel and adjacent to the solid layer, a successive uppermost liquid layer of the liquid;
   characterized by
      a measuring device for measuring a height distribution over at least part of the surface of the created uppermost liquid layer; and
      means for controlling the solidifying means to carry out the solidifying, based on such measured height distribution, in order to compensate for unflatness of the measured height distribution.

4. A system according to claim 3, wherein the solidifying means is arranged for emitting radiation onto the predetermined area, and wherein said means for controlling the solidifying means is arranged for calculating, based on the measured height distribution, a corresponding distribution of radiation intensity to be applied to the predetermined area.

* * * * *

UNITED STATES PATENT AND TRADEMARK OFFICE
CERTIFICATE OF CORRECTION

PATENT NO. : 8,454,880 B2  Page 1 of 1
APPLICATION NO. : 12/867077
DATED : June 4, 2013
INVENTOR(S) : Herman Hendrikus Maalderink It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this

Eighth Day of September, 2015

Michelle K. Lee
*Director of the United States Patent and Trademark Office*